(12) United States Patent
Sugano et al.

(10) Patent No.: US 7,068,397 B2
(45) Date of Patent: Jun. 27, 2006

(54) IMAGE FORMING APPARATUS AND IMAGE READING DEVICE FOR USE IN THE APPARATUS

(75) Inventors: Masashi Sugano, Tokyo (JP); Kouichi Sawada, Tokyo (JP); Takayuki Suzuki, Tokyo (JP)

(73) Assignee: Konica Corporation, Tokyo (JP)

( * ) Notice: Subject to any disclaimer, the term of this patent is extended or adjusted under 35 U.S.C. 154(b) by 1046 days.

(21) Appl. No.: 09/756,036

(22) Filed: Jan. 5, 2001

(65) Prior Publication Data

US 2001/0019428 A1 Sep. 6, 2001

(30) Foreign Application Priority Data

Jan. 17, 2000 (JP) .............................. 2000-007649

(51) Int. Cl.
*H04N 1/36* (2006.01)
(52) U.S. Cl. ...................... 358/409; 358/410; 358/411; 358/412
(58) Field of Classification Search ................ 358/409, 358/410–412; 375/130, 139, 336; 386/33
See application file for complete search history.

(56) References Cited

U.S. PATENT DOCUMENTS

| | | |
|---|---|---|
| 5,781,074 A | 7/1998 | Nguyen et al. |
| 5,872,807 A * | 2/1999 | Booth et al. ................. 375/130 |
| 5,933,587 A | 8/1999 | Sakai et al. |
| 6,014,063 A | 1/2000 | Liu et al. |
| 6,134,375 A * | 10/2000 | Naganawa et al. ........... 386/33 |

FOREIGN PATENT DOCUMENTS

EP 0 739 089 A2 10/1996

OTHER PUBLICATIONS

Patent Abstracts of Japan, vol. 2000, No. 21, Aug. 3, 2001 & JP 2001 092311 A (Canon Inc.), Apr. 6, 2001.

* cited by examiner

*Primary Examiner*—Twyler M. Lamb
(74) *Attorney, Agent, or Firm*—Frishauf, Holtz, Goodman & Chick, P.C.

(57) ABSTRACT

An image forming apparatus which forms an image on a recording material, which has: a writing section to write according to the image data; an oscillator to generate a synchronized synchronizing clock signal; a spreading clock generator to spread the band of a synchronized reference clock and generate spreading clock signals; and a plurality of control circuits to control the image forming apparatus and each section of the image forming apparatus including a writing control circuit to control the writing section. More than one control circuits in the control circuits other than the writing control circuit are driven by the spreading clock signals, and the writing control circuit is driven by the synchronizing clock signal.

12 Claims, 6 Drawing Sheets

IMAGE FORMING APPARATUS AND IMAGE READING DEVICE FOR USE IN THE APPARATUS

BACKGROUND OF THE INVENTION

The present invention relates to an image forming apparatus to form an image on a recording material, and to an image reading device to read out the image of a document.

A digital copier is, in its function, structured by the image forming apparatus to form an image on a recording material, and an image reading device to read out the image of the document. In the digital copier, various control circuits are used. For example, there are a writing control circuit to control a writing section to conduct writing according to the image data, a photoelectric conversion control circuit to control a photoelectric conversion section to receive the light from the document and photoelectrically convert it, a reading image processing circuit to image process the image data output from the photoelectric conversion section, an operation control circuit to control an operation section, a sequence control circuit to control the sequence of the overall image forming apparatus, and an ADF control circuit to control an automatic document feeding apparatus. These control circuits are driven by using, for example, a quartz oscillator, by a clock signal synchronized with a predetermined frequency, and the data is transferred between respective control circuits, and reading out of the image data or image formation are conducted. The clock signal is one of the largest generation sources of the electromagnetic interference, so called EMI. As the countermeasure for it, conventionally, various countermeasures are taken in the manner that these control circuits are surrounded by a frame body, or the similar manner, however, it is an actual situation that these are not yet satisfactory.

As a countermeasure for the EMI of the clock signal, a technology which recently attracts one's attention is a technology in which the Spectrum Spreading clock (SSC) theory is applied on the Spectrum Spreading clock generator (SSCG). This technology can spread the band of the synchronized clock signal, and thereby, can attenuate the peak radiation of the fundamental wave or the higher harmonics. FIG. 6 is a view in which the horizontal axis shows the frequency and the vertical axis shows the electromagnetic wave radiant intensity, and is a view typically showing the spectrum spreading clock. As can clearly be sheen FIG. 6, to the waveform of the synchronized clock (broken line) before spreading, in the spectrum spreading clock which is modulated and spread, the intensity becomes low.

As described above, the SSCG is effective for the EMI countermeasure, however, when the present inventors apply this onto the image forming apparatus or image reading device as it is, various problems are found. For example, various problems are generated as follows: fine image recording can not be conducted, or image recording can not be finely conducted, or image reading can not be finely conducted, and further, the matching among various control circuits can not be obtained.

SUMMARY OF THE INVENTION

Accordingly, the object of the present invention is to remove these problems, and to provide the image forming apparatus and the image reading device, in which, while the fine image recording or image reading are carried out, the EMI countermeasure can also be sufficiently taken.

The above objects can be attained by any one of the following Structures (1) through (11).

(1) An image forming apparatus for forming an image on a recording material, which has: a writing section to write according to the image data; an oscillator to generate a synchronized synchronizing clock signal; a spreading clock generator to spread the band of a synchronized reference clock and generate spreading clock signals; and a plurality of control circuits to control the image forming apparatus and each section of the image forming apparatus including a writing control circuit to control the writing section, the image forming apparatus is characterized in that more than one control circuits in the control circuits other than the writing control circuit are driven by the spreading clock signals, and the writing control circuit is driven by the synchronizing clock signal.

(2) An image reading device which has: a photoelectric conversion section which receives the light from a document and photoelectrically converts it; a photoelectric conversion control circuit to control the photoelectric conversion section; a reading image processing circuit to image-process the image data outputted from the photoelectric conversion section, the image reading device is characterized in that: it has a spreading clock generator to spread the band of a synchronized reference clock, and generate the spreading clock signals; and the photoelectric conversion control circuit and the reading image processing circuit are driven by the same spreading clock signals among the spreading clock signals.

(3) An image forming apparatus which has: a laser light source to emit the light; a deflecting device to deflect the light emitted from the laser light source in the primary scanning direction; a detector to detect the deflected light by the deflecting device and output an index signal; and a writing control circuit to control the modulation of the light emitted from the laser light source according to the index signal outputted from the detector, the image forming apparatus is characterized in that: it has a spreading clock generator to spread the band of the synchronized reference clock according to a predetermined modulation profile, and generate the spreading clock signals, and a reset section to reset the spreading clock generator according to the index signal; and the writing control circuit is driven by the spreading clock signals.

(4) An image forming apparatus forming an image on a recording material, which has: the first spreading clock generator to spread the band of the synchronized reference clock and generate the first spreading clock signals; the second spreading clock generator to spread the band of the synchronized reference clock and generate the second spreading clock signals; the first control circuit which controls the image forming apparatus or each section of the image forming apparatus, and is driven by the first spreading clock signals; and the second control circuit which controls the image forming apparatus or each section of the image forming apparatus, and is driven by the second spreading clock signals, the image forming apparatus is characterized in that the spreading width of the first spreading clocks and the spreading width of the second spreading clocks are different from each other.

(5) The image forming apparatus according to Structure (4), wherein the first control circuit is an IF control circuit to control an interface to communicate with the outer equipments; and the second control circuit is at least one control circuit in a writing control circuit to control a writing section to conduct writing according to the image data, the photoelectric conversion control circuit to control the photoelectric conversion section to receive the light from the document and photoelectrically convert it, the reading image processing circuit to image process the image data outputted from the photoelectric conversion section, the operation control circuit to control the operation section, the sequence control circuit to control the sequence of the overall image forming apparatus, and the ADF control circuit to control the automatic document feeding apparatus; and the spreading width of the first spreading clocks is smaller than the spreading width of the second spreading clocks.

(6) The image forming apparatus according to Structure (4), wherein the first control circuit is a writing control circuit to control the writing section to write according to the image data; and the second control circuit is at least one control circuit in the photoelectric conversion control circuit to control the photoelectric conversion section to receive the light from the document and photoelectrically convert it, the reading image processing circuit to image process the image data outputted from the photoelectric conversion section, the operation control circuit to control the operation section, the sequence control circuit to control the sequence of the overall image forming apparatus, the ADF control circuit to control the automatic document feeding apparatus, and the IF control circuit to control an interface to communicate with the outer equipments; and the spreading width of the first spreading clocks is smaller than the spreading width of the second spreading clocks.

(7) The image forming apparatus according to structure (4), wherein the first control circuit is the photoelectric conversion control circuit to control the photoelectric conversion section to receive the light from the document and photoelectrically convert it; and the second control circuit is at least one control circuit in the operation control circuit to control the operation section; the sequence control circuit to control the sequence of the overall image forming apparatus; and the ADF control circuit to control the automatic document feeding apparatus; and the spreading width of the first spreading clocks is smaller than the spreading width of the second spreading clocks.

(8) An image forming apparatus to form the image on the recording material, which has the IF control circuit to control the interface which is driven by the first spreading clocks in which the band of the synchronized reference clock is spread, and which communicates with the outer equipments; the writing control circuit to control the writing section which is driven by the second spreading clocks in which the band of the synchronized reference clock is spread, and which writes according to the image data; the photoelectric conversion control circuit to control the photoelectric conversion section which is driven by the third spreading clocks in which the band of the synchronized reference clock is spread, and which receives the light from the document and photoelectrically converts it; and at least one control circuit in the operation control circuit which is driven by the fourth spreading clocks in which the band of the synchronized reference clock is spread, and which controls the operation section; the sequence control circuit to control the sequence of the overall image forming apparatus; and the ADF control circuit to control the automatic document feeding apparatus, the image forming apparatus is characterized in that: the spreading width of the first spreading clocks is smaller than the spreading width of the second spreading clocks, and the spreading width of the second spreading clocks is smaller than the spreading width of the third spreading clocks, and the spreading width of the third spreading clocks is smaller than the spreading width of the fourth spreading clocks.

(9) An image forming apparatus to form the image on the recording material, which is characterized in that: it has, the fist spreading clock generator which spreads the band of the synchronized reference clock, and generates the first spreading clock signals; the first control circuit which controls the image forming apparatus or each section of the image forming apparatus and which is driven by the first spreading clocks; the second control circuit to control the image forming apparatus or each sections of the image forming apparatus; a communication line through which the data communication is conducted between the first control circuit and the second control circuit; and a temporary storage section which is provided in the communication line and temporarily stores the communication data.

(10) The image forming apparatus according to Structure (8), wherein it has the second spreading clock generator which spreads the band of the synchronized reference clock, and generates the second spreading clock signals, and the second control circuit is driven by the second spreading clock signals.

(11) An image forming apparatus for forming the image on the recording material, the image forming apparatus is characterized in that: it has, the writing section to write according to the image data; the first spreading clock generator which spreads the band of the synchronized reference clock and generates the first spreading clock signals; the second spreading clock generator which spreads the band of the synchronized reference clock and generates the second spreading clock signals; the first control circuit which controls the image forming apparatus or each section of the image forming apparatus, and is driven by the first spreading clock signals; and the second control circuit which controls the image forming apparatus or each section of the image forming apparatus, and is driven by the second spreading clock signals, and the first spreading clock generator is in timed relationship with the second spreading clock generator.

DETAILED DESCRIPTION OF THE PREFERRED EMBODIMENT

Figure 1:
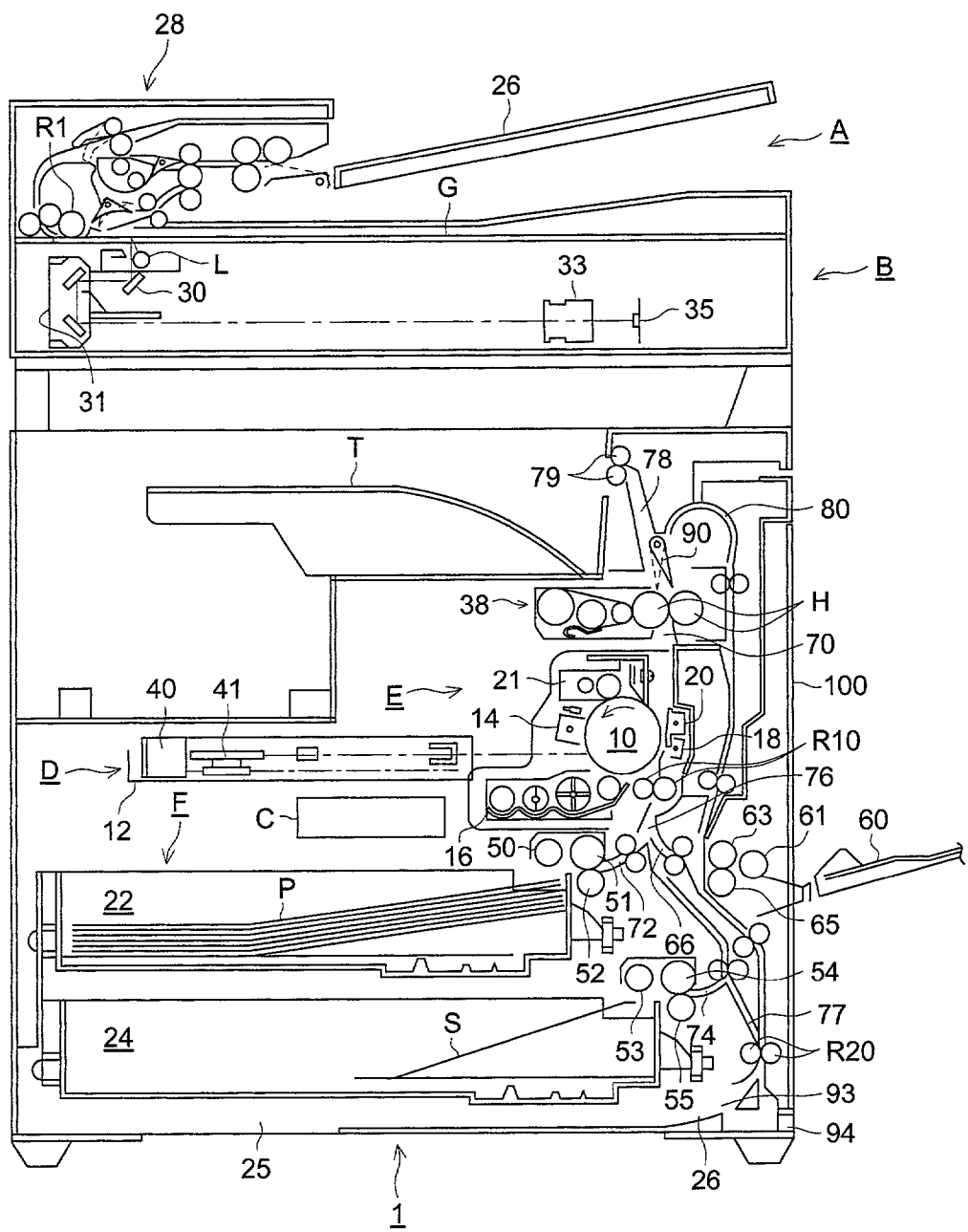
FIG. 1 is a typical view showing the structure of a digital copier 1 (hereinafter, simply called also a copying apparatus).

Referring to the drawings, the present invention will be described below, however, prior to this, an outline of a digital copier having an image forming apparatus and an image reading device will be described. FIG. 1 is a typical view showing a structure of the digital copier 1 (hereinafter, simply called also copying apparatus).

In the drawing, the copying apparatus has an automatic document feeder (a popular name, ADF) A, and a document image reading section B to read an image of the document conveyed by the automatic document conveying device A, and an image forming section (no sign) to image-form the image read out by the document image reading section B on the recording sheet, and the document image reading section B is provided above the image forming section, and the automatic document conveying device A is provided above the automatic document reading section B.

The image forming section has a writing section D to write according to the read out image data, an engine section E to image-form on the recording sheet, and a plurality of feeding sheet accommodation means (hereinafter, called a feeding sheet tray, or simply, tray) 22 and 24, such as the tray to accommodate the recording sheet P.

Main components of the automatic document conveying device A are a document platen 26, a group of rollers including a roller R1, and a document conveying processing section 28 including a switching means (no reference sign) for appropriately switching the movement path of the document. The document image reading section B is provided below a platen glass G, and are composed of two mirror units 30 and 31 which can reciprocally move keeping the optical length, a fixed image formation lens (hereinafter, simply called lens) 33, and a line-like image pick-up element (hereinafter, called CCD) 35. In the automatic document conveying device A, although the structure is different from the conventional document conveying device, because its principle itself is well known, and the document reading section B is well known, its explanation will be briefly conducted.

The writing section D is composed of a laser light source (hereinafter, called also LD) 40, and a polygonal mirror (a deflecting device, hereinafter, called polygonal mirror) 42, and conducts image-wise exposure on an image carrier 10 according to the image data. The engine section E is structured by the image carrier 10 composed of a photoreceptor drum, charging electrodes 14, developing means 16 composed of a magnetic brush type developing device, a transfer electrode 18, a separation electrode 20, a cleaning means 21, and a fixing means H, and a means for forming the image on the recording sheet. This engine section E forms a toner image on the image carrier 10, and the toner image is transferred onto the sheet, and the toner image is fixed on the sheet, and because its structure and processes are well known, the explanation will be briefly conducted.

In the above structure, an outline process in which after the toner image is formed on the image carrier 10, and the toner image is transferred onto the sheet, the sheet is delivered onto the delivery sheet tray, is as follows.

One of documents (not shown) placed on the document platen 26 is conveyed in the document conveying processing section 28, and during its passage under the roller R1, the slit exposure is conducted by the exposure means L. The reflection light from the document passes through the mirror units 30, 31 and the lens 33, and is image-formed on the CCD, and read out. The image information (image data) read out by the document image reading section B is image-processed, and compressed and stored in an image memory Z3 shown in FIG. 2.

Then, the image data stored in the image memory Z3 is read out corresponding to the image formation and enlarged, and according to the image data, the LD 40 in the writing section D is driven, and the exposure is conducted on the image carrier 10. Prior to the exposure, although the predetermined surface potential is given onto the image carrier 10 rotated in the arrowed direction (counterclockwise direction) by the corona discharging action by the charging electrode 14, by the exposure, the potential of the exposed portion is decreased corresponding to the exposure amount, as the result, an electrostatic latent image corresponding to the image data is formed on the image carrier 10. The electrostatic latent image is reversal developed by the developing means 16, and a visual image (toner image) is formed.

On the one hand, before the leading edge portion of the toner image on the image carrier 10 reaches the transfer area, for example, one sheet P in the feeding sheet tray 22 is fed and reaches a register roller R10, and its leading edge is restricted. The sheet P is conveyed toward the transfer area by the register roller R10 which starts the rotation being in timed relationship with the toner image so that the toner image, that is, the toner image formed on the image carrier 10 is superimposed on the image area. In the transfer area, the toner image on the image carrier 10 is transferred onto the sheet P by energizing of the transfer electrode, and next, the sheet P is separated from the image carrier 10 by energizing by the separation electrode 20.

After that, by the pressing and heating of the fixing means H, the toner powder forming the toner image is fused and fixed on the sheet P, and the sheet P is delivered onto the delivery sheet tray T through the delivery sheet path 78 and the delivery sheet roller 79 which is a delivery sheet means. In this connection, in FIG. 1, the sheet P is shown only in the feeding sheet tray 22.

Herein, the reference sign S in the feeding sheet tray 24, is a movable plate whose free end is always forced upward, by the forcing means such as a coil spring, not shown, and as the result, the uppermost sheet is brought into contact with a feeding roller which will be described later. In this connection, the feeding sheet tray 22 also has the same structure as the above structure. The feeding sheet trays 22 and 24 are feeding sheet accommodation means for accommodating the sheets, and in the embodiment, although these are arranged in two stages in the upper and lower directions, the more number of feeding sheet trays can be provided.

A space portion 25 having a predetermined gap is formed between the bottom portion of the feeding sheet tray 24 and the bottom wall of the apparatus main body. This space portion 25 is used in a mode in which the image is formed on both sides of the sheet P, and in the space portion 25, a reversing path to reverse the front and rear sides of the sheet, which is a portion of the second conveying path 80 (which will be described later) for the front and rear reversing of the sheet, is structured.

Above the leading edge portion (in the sheet feeding direction, corresponds to leading edge of the accommodated sheet P) of the respective feeding sheet trays 22 and 24, sending rollers 50 and 53, feed rollers 51, 54, provided downstream the sending rollers 50, 53, and the double feeding prevention rollers 52 and 55 which come into pressure contact with the feed rollers 51 and 54, and prevent the plural sheets feeding, are provided, and these are a sheet feeding means for sending out the sheet accommodated in the feeding sheet trays 22 and 24, while separating the sheet one sheet by one sheet.

Numeral 60 is a manual sheet feeding tray at least one portion of which is protruded to the outside of the image forming apparatus main body, and which is an external accommodation means on which sheets are placed, and is structured such that it can be opened and closed around the lower end to the main body side wall of the image forming apparatus. In order to send out the sheet P placed on the manual sheet feeding tray 60 corresponding to the image formation, the sending roller 61, feed roller 63 provided downstream the sending roller 61, and the double feeding prevention roller 65 which comes into pressure contact with the feed roller 63, and prevents the plural sheets feeding of the sheet P, are the external sheet feeding means having practically the same structure, so that the same function as the sheet feeding means provided corresponding to the sheet feeding trays 22 and 24 is performed.

The sheet conveying path has an image forming path 70 (in the movement direction of the sheet, extending from the lower side to the upper side) to conduct the image formation (image recording) on the sheet P, an upper stage sheet feeding path 72 to convey the sheet accommodated in the upper stage sheet feeding tray 22, a lower stage sheet feeding path 74 to convey the sheet accommodated in the lower stage sheet feeding tray 24, and a delivery sheet path 78 to deliver the sheet on which the image is formed, onto the delivery sheet tray T. That is, the sheets from each of sheet feeding trays 22 and 24, through the image forming means E, to the delivery sheet roller 79, are conveyed. The conveying path through which the sheet is conveyed, is defined as the first conveying path in the present specification. In this connection, the first conveying path is the conveying path through which the sheet is conveyed when the image is formed on the single side of the sheet.

The (upper side) branching guide 90 is controlled such that the sheet P on the first side of which the image is formed, or on the both sides of which the image is formed, is forwarded to the delivery sheet path 78, or is forwarded to the second conveying path 80, which will be described later. In other words, it is a switching means which is controlled corresponding to the user set image formation mode (a mode in which the image is formed only on the single side of the sheet, or a mode in which the image is formed on both sides of the sheet), and by which, in FIG. 1, toward the upper side, the conveying path of the sheet P being conveyed on the image forming path 70 is switched to the sheet delivery path 78 or to the second conveying path. Specifically saying, when a mode in which the image formation is conducted on both sides of the sheet is set, the branching guide 90 is controlled, so that the sheet P on the first side of which the image is formed, and which has the transfer toner image, is sent to the second conveying path 80, and so as to be positioned in the broken line position in the drawing, through the control section, not shown. Further, when a mode in which the image is formed on the single side of the sheet is set, or when a mode in which the image is formed on both sides of the sheet is set, and the sheet on both sides of which the image is formed, is conveyed, the branching guide 90 is controlled so that it is positioned in the solid line position in the drawing, through the control section, not shown.

Further, the image forming apparatus has the second conveying path 80 so that the image formation can be carried out again on the sheet on the single side of which the image is formed. The image formation process onto the second surface of the sheet is as follows.

As described above, when the sheet P on the first surface of which the image is formed, is moved upward on the first conveying path (image forming path 70), and the its leading edge reaches the branching guide 90, because the branching guide 90 is kept at the broken line position of the drawing, the sheet P enters into the second conveying path 80, and the movement is continued. The entering section of the second conveying path 80 draws a gentle circular arc, and assures the smooth movement of the sheet P. Then, the sheet P which draws the circular arc at the entering portion of the second conveying path 80 and takes a U-turn, is moved downward on the second conveying path 80 to the reversing path, and nipped by the reversing roller R20, and is sent to the direction of the branching guide 93. At this time, because the branching guide 93 is positioned at the solid line position shown in the drawing, the sent out sheet P is guided to the space portion 25 formed below the lower stage sheet feeding tray 24. The first side on which the image is formed, of the sheet P guided to the space portion 25 exists on the lower side.

Then, the rotation of the reversing roller R20 is stopped in the condition that the trailing edge of the sheet P is nipped, and then, when the reversing roller R20 starts the rotation in the reversal direction to the above direction, the sheet P is sent to the first conveying path (the image forming path 70 through the lower stage sheet feeding path 74) in the condition that the front and rear are reversed, that is, the second surface on which no image is formed, faces the image carrier 10 side, and its leading edge is restricted by the register roller R10.

On the one hand, the second toner image (the toner image of the rear side) is formed on the image carrier 10 by the above process, and when the register roller R10 is rotated in timed relationship with the rotation of the image carrier 10, the sheet P enters into the transfer area in the condition that it is superimposed on the second toner image area. After that, the transfer processing, separation processing, and fixing processing are conducted, and when the leading edge of the sheet P on which the rear side image is formed reaches a portion at which the branching guide 90 exists, because the branching guide 90 is kept at the solid line position in the drawing, and the image forming path 70 communicates with the sheet delivery path 78, and the communication with the second conveying path 80 is cut, the sheet P enters into the sheet delivery path 78, and is delivered onto the delivery sheet tray T through the delivery sheet roller 79.

Figure 2:
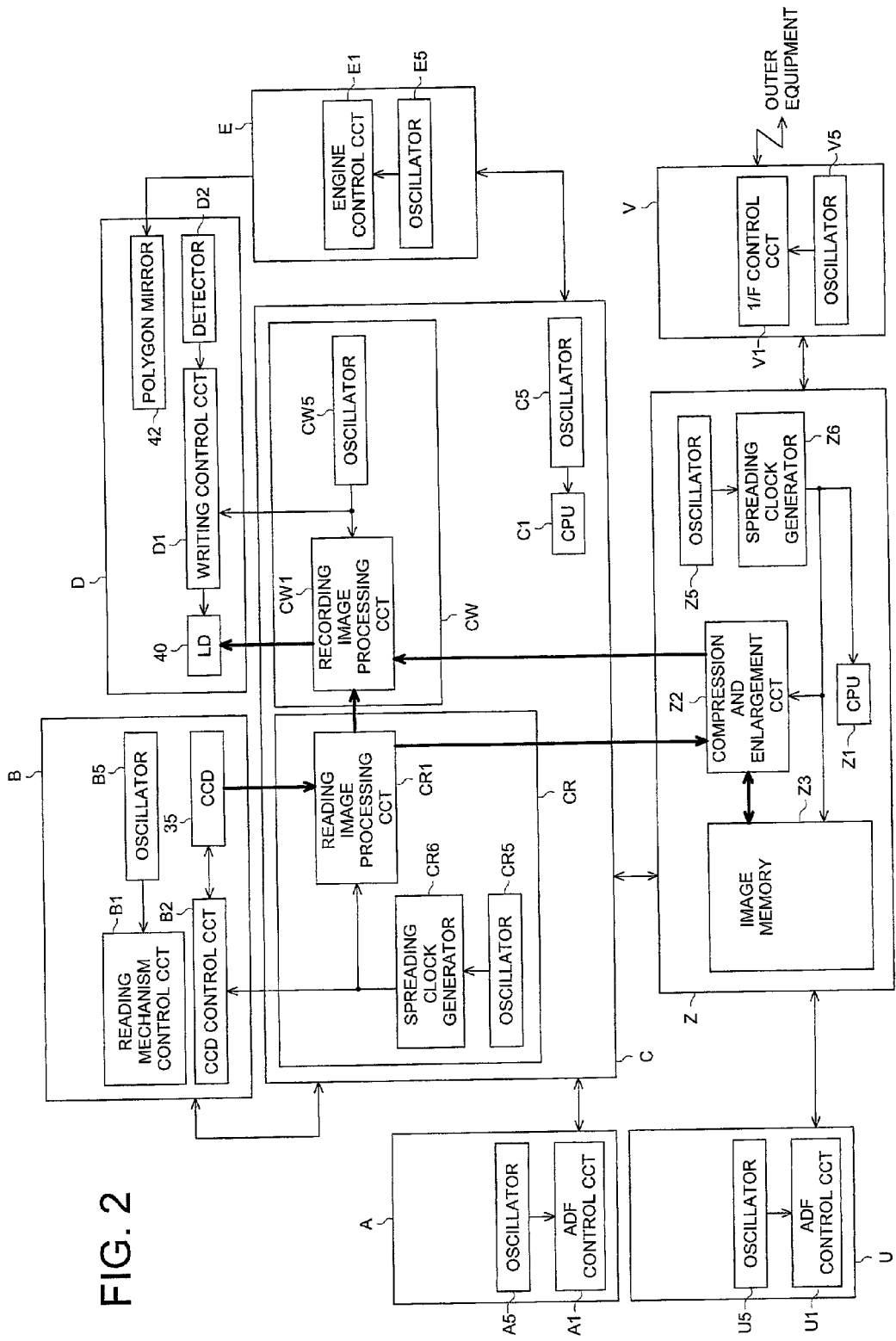
FIG. 2 is a block diagram expressing a control system of the copier 1 of the first embodiment.

Incidentally, the manual sheet feeding tray 60 provided in the manual sheet feeding section is, in the embodiment, as shown in FIG. 2, provided on an open and close door 100 whose outside surface is a side wall of the apparatus main body. Further, the sheet feeding means for sending the sheet placed on the sheet feeding tray 60 including the manual sheet feeding tray 60, is attached to the open and close door at the almost same position as the sheet feeding device for the sheet feeding tray 22.

The conveying path (hereinafter, called the third conveying path) 66 of the sheet P sent from the sheet feeding tray 60 into the apparatus, is structured such that it extends crossing the second conveying path 80, and communicates with the first conveying path. Specifically, it is structured such that its end is on this side (upstream side) of the image recording section in which the transfer electrode 18 exists on the upstream side in the sheet conveying direction of the image forming path 70, more specifically, the joining portion 76 which is on this side (upstream side) of the register roller R10.

First Embodiment

The above copier 1 is taken as an example, and the first embodiment will be described below. FIG. 2 is a block diagram showing the control system of the copier 1.

The automatic document conveying device A is, as described above, the device to convey the document, and the control system has the ADF control circuit A1 which is the control circuit to drive control the automatic document conveying device A, and the oscillator A5 to oscillate the clock signal. This oscillator A5 is a circuit to generate the clock signal synchronized with a predetermined frequency (hereinafter, called the synchronizing clock signal, and also reference clock signal), and for example, a quartz oscillator, or the like, is used. The ADF control circuit A1 is a circuit to drive and control a document conveying processing section 28 including a roller group or switching means or the sensor (not shown) to detect the size of the document, and may also be structured only by a gate array, or other than the gate array, may also have a CPU together with a ROM or RAM. This ADF control circuit A1 is driven by the synchronizing clock signal generated in the oscillator A5. Further, the automatic document conveying device A conducts sending and receiving of the data to the image processing & engine control substrate (hereinafter, called also engine control substrate), which will be described later, and the control of conveyance of the document is conducted while being controlled by the engine control substrate C.

The document image reading section B is, as described above, a section to photoelectrically convert the image of the document, and as the control system, a reading mechanism control circuit B1 which is a control circuit to drive and control the mechanism of the document image reading section B, an oscillator B5 to oscillate the synchronizing clock signal, and a CCD control circuit B2 which is the photoelectric conversion control circuit to control the CCD 35 which is the photoelectric conversion section, are provided. This oscillator B5 is, in the same manner as the above oscillator A5, a circuit to generate the synchronizing clock signal synchronized with a predetermined frequency. Then, the reading mechanism control circuit B1 is a circuit to control the drive of the mechanical system of the document image reading section B such as the movement of the two mirror units 30 and 31, or the movement of the lens 33 corresponding to the enlargement•reduction, and may be also structured only by the gate array, or may also have the CPU together with the ROM or RAM, other than the gate array. This reading mechanism control circuit B1 is driven by the synchronizing clock signal generated in the oscillator B5. Further, the CCD control circuit B2 is a control circuit to drive the CCD 35. The CCD control circuit B2 is driven not by the synchronized synchronizing clock signal, but, by the spreading clock signal, as will be described later. Further, the document image reading section B transfers the data to the engine control substrate C which will be described later, and conducts control while being controlled by the engine control substrate C.

As described above, the writing section D is a section to write according to the image data, and as the control section, a writing control section D1 to control the modulation of the light emitted from the LD 40 according to the image data, and a detector (index sensor) D2 to detect the light emitted from the LD 40, deflected by the polygon 42 which is a deflecting device, and output the index signal, are provided. Herein, the detector D2 is a detector to detect the light of the LD 40 for each line in the sub-scanning direction (the movement direction of the image carrier 10), and output the index signal, and according to the index signal, the writing start in the main scanning direction is conducted, and because this structure itself is publicly known, the explanation will be neglected herein. The writing control circuit D1 is a circuit to control the intensity modulation and/or pulse width modulation of the LD 40 according to the image data, and may also be structured only by the gate array, or may also have a CPU together with the ROM or RAM, other than the gate array. The writing control circuit D1 is driven by the synchronous clock generated in an oscillator CW1, which will be described later. Further, the writing section D transfers the data to the engine section E, which will be described later, or the engine control substrate C, and conducts the exposure (writing) according to the image data, while being controlled by the engine section E, or the engine control substrate C.

The engine section E is, as described above, a section which forms the image on the sheet, and as the control system, an engine control circuit E1 to control the operations of each section of the engine section E or process conditions, and an oscillator E5 to oscillate the synchronizing clock signal, are provided. The oscillator E5 is, in the same manner as the above described oscillator A5, a circuit to generate the synchronizing clock signal synchronized with a predetermined frequency. Then, the engine control circuit E1 is a circuit to control the drive of the above described image carrier 10, charging electrode 14, developing means 16, transfer electrode 18, separation electrode 20, and the fixing means H, and may also be structured only by the gate array, or may also have a CPU together with the ROM or RAM, other than the gate array. The engine control circuit E1 is driven by the synchronizing clock signal generated by the oscillator E5. The engine section E transfers the data to the engine control substrate C which will be described later, and conducts control while being controlled by the engine control substrate C.

The operation section U is a section to set the operation condition of the copier and for the user to set the operation on the operation panel (display section such as the liquid crystal and a panel provided with an input section such as a touch panel or keys) provided on the front surface of the copier 1, and as the control system, an operation control circuit U1 to control of the display of the operation panel, or to detect the pressing of the operation panel, and an oscillator U5 to oscillate the synchronizing clock signal, are provided. The oscillator U5 is, in the same manner as the above oscillator A5, a circuit to generate the synchronizing clock signal synchronized with a predetermined frequency. Then, the operation control circuit U1 is a circuit to conduct the display control on the liquid crystal and the control such as detection of the pressing of the touch panel or keys, and may also be structured only by the gate array, however, because the display characters are many, it is preferable that, other than the gate array, it has a CPU together with the ROM or RAM. This operation control circuit U1 is driven by the synchronizing clock signal generated in the oscillator U5. The oscillator U transfers the data to an overall control substrate Z, which will be described later, and conduct the control while being controlled by the overall control substrate Z, and transmits the information set by the user to the overall control substrate Z.

The interface section (hereinafter, called I/F section) V is an interface section to communicate (transfer of the data) with the outer equipments (for example, the outer equipments such as a FAX or print controller, and in this case, devices housed in the copier may also be allowable), and as the control system, an I/F control circuit V1 to control the interface with the outer equipments, and an oscillator V5 to oscillate the synchronizing clock signal, are provided. This oscillator V5 is, in the same manner as the above oscillator A5, a circuit to generate the synchronizing clock signal synchronized with a predetermined frequency. Then, the I/F control circuit V1 is a circuit to control the interface, and it may also be structured only by the gate array, however, other than the gate array, it may also have a CPU together with the ROM or RAM. This I/F control circuit V1 is driven by the synchronizing clock signal generated by the oscillator V5. The I/F section V transfers the data to the overall control substrate Z, which will be described later, and conducts the control while being controlled by the overall control substrate Z, and transmits the information from the outer equipments to the overall control substrate Z.

The engine control substrate C is a substrate to control the automatic document conveying device A, document image reading section B, writing section D, and engine section E, and to conduct the conveying control of the sheet or the image processing, and has a CPU C1 to conduct the management and control of them, the oscillator C5 to oscillate the synchronizing clock signal, the reading control section CR to conduct the image processing of the read image data, and the writing control section CW to conduct the image processing of the written image data. This oscillator C5 is, in the same manner as the above oscillator A5, a circuit to generate the synchronizing clock signal synchronized with a predetermined frequency. Then, the CPU C1 functions as the control circuit to conduct various controls by making the RAM, not shown, as an operation area, according to the program stored in the ROM, not shown. The CPU C1 is driven by the synchronizing clock signal generated in the oscillator C5. In this connection, the engine control substrate C is structured such that it transfers the data to the automatic document conveying device A, document image reading section B, writing section D, engine section E, and overall control substrate Z, which will be described later, and it controls the automatic document conveying device A, document image reading section B, writing section D, and engine section E, under the control by the overall control substrate Z.

The reading control section CR is a section which gives the clock signal to control the CCD control circuit B1, and conducts the image processing of the image data photoelectrically converted by the CCD 35, and structures a portion of the image reading device together with the document image reading section B. The reading control section CR has a reading image processing circuit CR1 to conduct the image processing of the image data, an oscillator CR5 to oscillate the reference clock signal, and a spreading clock generator CR6 to spread the reference clock signal. The reading image processing circuit CR1 is a circuit which conducts the image processing such as the area discrimination, brightness/density conversion, filtering, variable magnification, gamma conversion, error spreading, and smoothing, on the image data read by the CCD 35, and is structured only by the gate array, but, it may also have the CPU together with the ROM or RAM, other than the gate array. This oscillator CR5 is, in the same manner as the above oscillator A5, a circuit to generate the clock signal synchronized with a predetermined frequency. In this connection, in the present embodiment, because this clock signal is not used as it is, the clock signal oscillated from this oscillator CR5 is defined as the reference clock signal.

Figure 3:
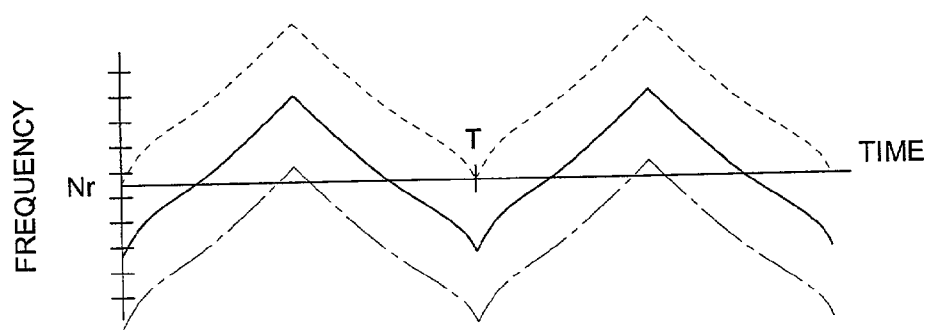
FIG. 3 is a view showing a modulation profile of a spreading clock generator.
Figure 6:
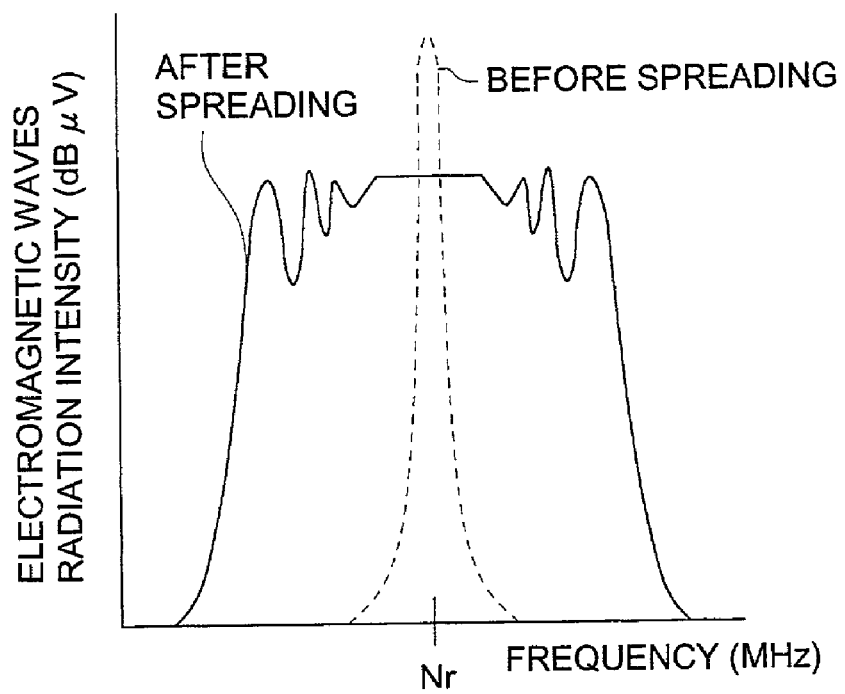
FIG. 6 is a view typically showing a spectrum spreading clock.

The spreading clock generator CR6 is a generator to spread the band of the synchronized reference clock signal and to generate the spreading clock (spectrum spreading clock) (refer to FIG. 6). This spreading clock signal is a signal in which the frequency is modulated at an interval of a predetermined period T, according to a predetermined modulation profile as shown in FIG. 3. In this connection, this modulation width (the left and right width in FIG. 6, and the upper and lower width in FIG. 3) is ±10% (preferably, within ±5%, more preferably, within ±2.5%) to the center of the frequency of the spread spreading clock signal (when the clock signal is spread around the frequency Nr of the reference clock signal, Nr), (solid line in FIG. 3). In this connection, in the modulation width, it is not necessary to conduct the modulation around the center of the reference clock signal, but the frequency of the reference clock signal may also be the largest frequency of the modulation width (a one-dotted chain line in FIG. 3), or reversely, may also be the smallest frequency of the modulation width (a chain line in FIG. 3). Further, as the modulation profile, it may also be a sinusoidal wave, however, the modulation profile as shown in FIG. 3, can reduce the more the peak of the EMI components.

Then, the spreading clock signal is inputted into the reading image processing circuit CR1 as the drive clock of the reading image processing circuit CR1, and the reading image processing circuit CR1 is driven by this spreading clock signal. Further, this spreading clock signal is also inputted into the CCD control circuit B1 as the drive clock of the CCD control circuit B1, and the CCD control circuit B1 is driven by the spreading clock signal. In this connection, the image data image processed in the reading image processing circuit CR1, is directly outputted to the recording image processing circuit CW1, which will be described later, or stored in the image memory Z3 through the compression enlargement circuit Z2, which will be described later.

The writing control section CW is a section to give the clock signal to control the writing control circuit D1 and to conduct the image processing of the image data. This writing control section CW has the a recording image processing circuit CW1 to conduct the image processing of the image data, and an oscillator CW5 to oscillate the reference clock signal. The recording image processing circuit CW1 is a circuit to conduct the image processing corresponding to the characteristic of the writing section D or the engine section E on the image data read from the image memory Z3 and enlarged, or the image data outputted from the reading image processing circuit CR1, and to output it to the LD 40, and is structured only by the gate array, however, it may also have the CPU together with ROM or RAM, other than the gate array. This oscillator CW5, in the same manner as the above oscillator A5, is a circuit to generate the synchronous clock synchronized with a predetermined frequency. This synchronizing clock signal is inputted into the recording image processing circuit CW1 as the drive clock of the recording image processing circuit CW1, and the recording image processing circuit CW1 is driven by this synchronizing clock signal. Further, the synchronizing clock signal is also inputted into writing control circuit D1 as the drive clock of the writing control circuit D1, and the writing control circuit D1 conducts the modulation corresponding to the image data outputted from the recording image processing circuit CW1 by the synchronizing clock signal, and drives the LD 40.

The overall control substrate Z is a substrate to conduct the control of the overall copier, that is, a substrate to conduct the control of the sequence of the overall copier. In this overall control substrate Z, a CPU Z1 which is the sequence control circuit to conduct the sequence control of the overall copier, compression and enlargement circuit Z2 to compress/enlarge the image data, image memory Z3 to store the image data, oscillator Z5 to oscillate the reference clock signal, and spreading clock generator Z6 to spread the reference clock, are provided. The description of the oscillator Z5 and the spreading clock generator Z6 is neglected because these are the same as the above oscillator CR5 and spreading clock generator CR6. Then, the CPU C1 functions as the sequence control circuit to conduct the sequence control of the overall copier by making the RAM, not shown, as an operation area, according to the program stored in the ROM, not shown. The CPU C1 is driven by the synchronizing clock signal generated in the oscillator Z5.

The compression and enlargement circuit Z2 is a gate array structured by the compression circuit to compress the image data (the image data image processed in the reading image processing circuit CR1) read by the CCD 35, and the enlargement circuit to enlarge the image data (compressed data) stored in the image memory Z3, which will be described later, and output to the recording image processing circuit CW1. Further, the image memory Z3 is a memory means to store the image data compressed by the compression and enlargement circuit Z2. This compression and enlargement circuit Z2 and the image memory Z3 are driven by the synchronizing clock signal generated in the oscillator Z5. In this connection, this overall control substrate Z is structured such that it transfers the data to the operation section U, I/F section V, and the engine control substrate C, and controls the overall copier.

As described above, in the present embodiment, the CCD control circuit B2 and the reading image processing circuit CR1 are driven by the same spreading clock signal. This is because, when the CCD control circuit B2 and the reading image processing circuit CR1 are driven by the different spreading clock signals, the matching of the image data outputted from the CCD 35 with the image data to be image processed, can not be obtained, and the fine image reading can not be conducted. In this connection, in the present embodiment, because the reading image processing circuit CR1 conducts the image processing at real time on the reading out of the CCD 35, specifically, this problem can be solved.

Further, the present embodiment is structured such that at least one control circuit (in the present embodiment, the CCD control circuit B2 and the reading image processing circuit CR1) is driven by the spreading clock signal, and the writing control circuit D1 is driven by the synchronizing clock signal. This is for the reason that, generally, the high accuracy is required for the writing system, and therefore, when the spreading clock is normally used, because the non-uniformity is easily generated in the writing due to the spreading, the fine image recording can be hardly attained. Then, because, in the present embodiment, the spreading clock signal is used, the peak radiation of the fundamental wave and the higher harmonics can be attenuated, and the EMI countermeasure can be satisfactorily taken.

Incidentally, in the present embodiment, as the spreading clock generator CR6, when the -W42C31-03G (made by CYPRESS) is used, and the spreading width is −2% (that is, ±1% to the center (about 25.8 MHz) of the frequency of the spreading clock signal), to the frequency 26.2135 MHz of the reference clock signal, and further, as the spreading clock generator Z6, when the -W42C31-09G (made by CYPRESS) is used, and the spreading width is ±1.25% (that is, ±1.25% to the center (39.9 MHz) of the frequency of the spreading clock signal), to the frequency 39.9000 MHz of the reference clock signal, the good result is obtained.

Second Embodiment

Figure 4:
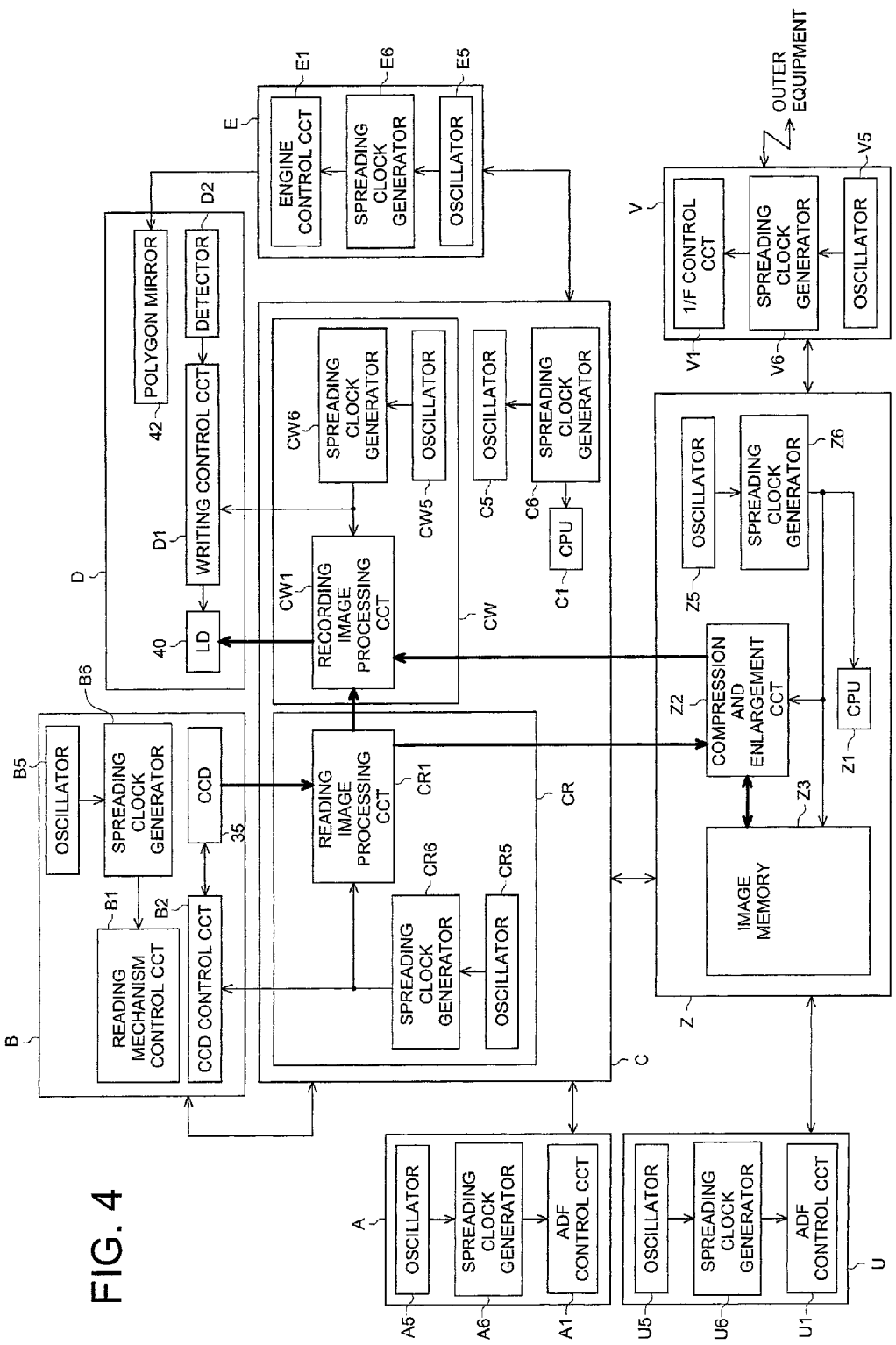
FIG. 4 is a block diagram expressing a control system of a copier 1 of the second embodiment.

Next, the second embodiment will be described. FIG. 4 is a block diagram showing the control system of a copier 1 in the second embodiment. Incidentally, in the present embodiment, same reference numerals and signs are given to the basically same structures as in the above first embodiment, and hereinafter, as far as it is not specifically described, the structure is the same as in the above first embodiment, and its explanation will be neglected.

In the above first embodiment, two spreading clock generators CR6 and Z6 are used, and the control circuits driven by the spreading clock signal in a plurality of control circuits are the CCD control circuit B2, reading image processing circuit CR1, CPU Z1, compression and enlargement circuit Z2, and image memory Z3. However, in the present embodiment, the spreading clock generators A6, B6, E6, U6, V6, C6, CR6, CW6, Z6 to spread respective bands are provided, for the synchronizing clock signals (reference clock signals) outputted from respective generators A5, B5, E5, U5, V5, C5, CR5, CW5, and Z5. As described above, the spreading clock generator is provided for all generators, and each control circuit is made to be driven by the spreading clock signal. Thereby, the EMI countermeasure can be further securely taken.

In this connection, when the spreading clock generator is simply provided at each portion, there are various problems that the good image recording can not be obtained, or the good image reading can not be conducted, and further the matching can not be obtained between various control circuits. Accordingly, in the present embodiment, in the case where the spreading width of the spreading clock signal generated in each of spreading clock generators A6, B6, E6, U6, V6, C6, CR6, CW6, and Z6, is respectively WA, WB, WE, WU, WV, WC, WCR, WCW, and WZ, when the setting of each spreading width is conducted as follows, the above problems can be solved.
WV<WCW<WCR<WA or WB, WE, WU, WC, WZ That is, when the spreading width WV of the spreading clock signal to drive the I/F control circuit V1 to communicate with the outer equipments is more narrowed, the generation of the communication errors with the outer equipments can be suppressed, and the matching with the outer equipments can be secured. Further, when the spreading width WCW of the spreading clock signal to drive the writing control circuit D1 to conduct the writing control is made wider than the spreading width WV, and narrower than the other spreading widths (WCR, WA, WB, WE, WU, WC, WZ), then, the un-uniformity due to the spreading can be suppressed in the writing, and the good image recording can be conducted. Further, when the spreading width WCR of the spreading clock signal to drive the CCD control circuit B2 is wider than the spreading widths WV and WCW, and narrower than the other spreading widths (WA, WB, WE, WU, WC, WZ). For this, as the result of consideration by the present inventors, in the reading system, the influence of the image signal by the spreading clock signal appears as the change of accumulation time when the CCD 35 reads in 1 line image, and the influence on the image data of each 1 pixel is small. Further, the change of the spreading width of the clock is so small as negligible, as compared to the accumulation time of 1 line. In contrast to this, in the writing system, the influence on the image signal by the spreading clock signal appears at the print position of each 1 pixel, and the change of print position of individual pixel becomes jitter and causes the lowering of the image quality.

Further, in the present embodiment, the output of the index signal by the detector (index sensor) D2 is structured such that it is inputted also into the spreading clock generator CW6. In the spreading clock generator CW6, when this index signal is inputted, it is structured so as to be reset. That is, in the spreading clock generator CW6, as described above, according to the modulation profile, the frequency is modulated at an interval of a predetermined period T, and the band of the reference clock signal is spread, however, because the reset is conducted according to the index signal, in each line of the main scanning, the same spreading manner can always be taken, and the good image writing can be conducted. Specifically, in this case, because the spreading manner is previously known by the modulation profile, when the image processing (image processing by the recording image processing circuit CW1) is conducted according to that, the better image writing can be conducted.

In this connection, in the present embodiment, it is structured such that the spreading clock generator CW6 is reset corresponding to the index signal, however, when the reset is not conducted, and the writing control circuit D1 is driven by the spreading clock signal, the moire which is a problem at the time of the image writing, can be prevented by the spread of the spreading clock signal. In this case, it is preferable when the integer times of the period T of the modulation profile may not be the time to scan the 1 line of the main scanning.

Figure 5:
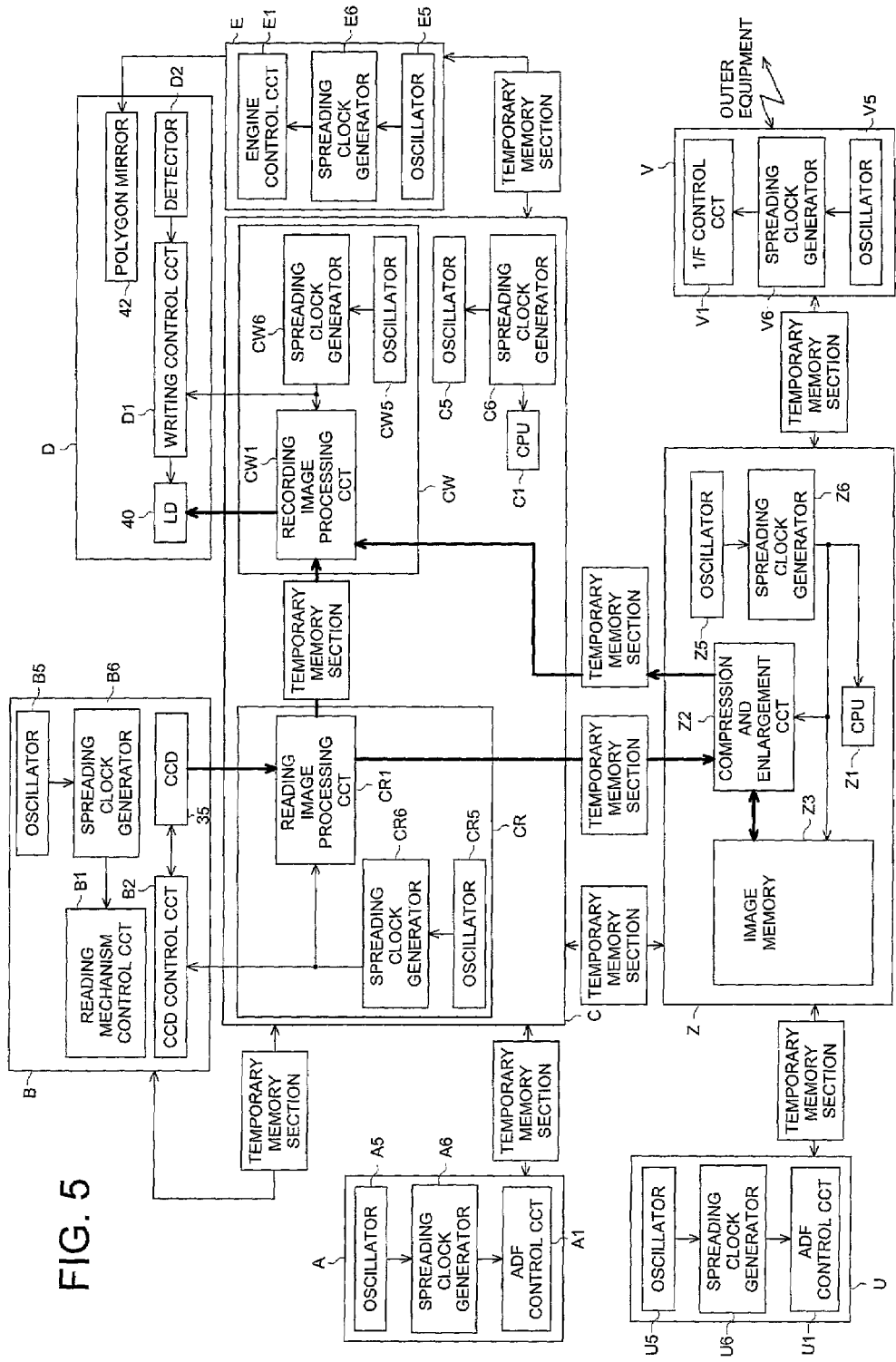
FIG. 5 is a block diagram expressing a control system of a copier 1 of a modified example of the second embodiment.

Further, as in the present embodiment, in the case where a plurality of spreading clock generators are used, and the spreading widths of the clock signals generated by them are different, when the information is transferred between each of control circuits, the transmission error is generated. Therefore, as shown in FIG. 5, it is preferable that a temporary storage section (buffer or the like) to temporarily store the communicated data is provided on the middle of the communication line through which the data communication is conducted between each of control circuits. Thereby, the transfer of the data can be conducted without paying attention to the difference of the spreading width, and the generation of the transmission error can be prevented, and the matching among various control circuits can be easily obtained.

Further, as in the present embodiment, when a plurality of spreading clock generators are used in one apparatus, there is a case where it is wanted to be in timed relationship with each of control circuits. Therefore, it is preferable that the system is structured such that a plurality of spreading clock generators are in timed relationship with each other. This method of being in timed the relationship with each other, can be conducted, for example, in such a manner that the reset signal is given to a plurality of spreading clock generators with which it is wanted to be in timed relationship, as described above. In this case, it is not necessary to reset all of the plurality of spreading clock generators, but, it is satisfactory to reset at least the spreading clock generator with which it is wanted to be in timed relation ship.

Further, when the substrate on which each control circuit using the spectrum spreading clock is provided, is covered by a metallic frame body or metal plating frame body, although the system already takes the EMI countermeasure, further, also in the appearance, it can give the impression in which the leakage of the radiation noise is prevented, to the user.

As detailed above, according to the present invention, an image forming apparatus and image reading device by which fine image recording and image reading can be carried out, and further the matching among various control circuits can be obtained, and the EMI countermeasure can also be satisfactorily taken, can be provided.

What is claimed is:

1. An image forming apparatus for forming an image on a recording material, the image forming apparatus comprising:
   (a) a writing section for writing according to image data;
   (b) an oscillator for generating a synchronizing clock signal synchronized with a predetermined frequency;
   (c) a spreading clock generator for spreading a band of a reference clock which is synchronized with the predetermined frequency, and generating spreading clock signals; and
   (d) a plurality of control circuits for controlling the image forming apparatus or each section of the image forming apparatus including a writing control circuit for controlling the writing section,
   wherein at least one control circuit of the control circuits other than the writing control circuit is driven by the spreading clock signals, and the writing control circuit is driven by the synchronizing clock signal.

2. The image forming apparatus of claim 1, further comprising:
   (a) a photoelectric conversion section for receiving light from an original document and for conducting a photoelectric conversion;
   (b) a photoelectric conversion control circuit for controlling the photoelectric conversion section;
   (c) a reading image processing circuit for processing image data output from the photoelectric conversion section; and
   (d) a spreading clock generator for spreading a band of a reference clock which is synchronized with a predetermined frequency, and for generating spreading clock signals,
   wherein the photoelectric conversion control circuit and the read image processing circuit are driven by the same spreading clock signal of the spreading clock signals.

3. An image forming apparatus comprising:
   (a) a laser light source for emitting light;
   (b) a deflector for deflecting the light emitted from the laser light source in a primary scanning direction;
   (c) a detector for detecting the light deflected by the deflector, and outputting an index signal;
   (d) a writing control circuit for controlling a modulation of the light emitted from the laser source according to the index signal output from the detector;
   (e) a spreading clock generator for spreading a band of a reference clock which is synchronized with a predetermined frequency, and generating spreading clock signals according to a predetermined modulation profile; and
   (f) a resetting section for resetting the spreading clock generator according to the index signal,
   wherein the writing control circuit is driven by the spreading clock signals.

4. The image forming apparatus of claim 3, wherein the detector outputs the index signal for each line in a sub-scanning direction.

5. An image forming apparatus for forming an image on a recording material, comprising:
   (a) a first spreading clock generator for spreading a band of a reference clock which is synchronized with a predetermined frequency, and for generating first spreading clock signals;
   (b) a second spreading clock generator for spreading a band of a reference clock which is synchronized with the predetermined frequency, and for generating second spreading clock signals;
   (c) a first control circuit for controlling the image forming apparatus or each section of the image forming apparatus, the first control circuit being driven by the first spreading clock signals; and
   (d) a second control circuit for controlling the image forming apparatus or each section of the image forming apparatus, the second control circuit being driven by the second spreading clock signals,
   wherein a spreading width of the first spreading clock signals is different from that of the second spreading clock signals.

6. The image forming apparatus of claim 5,
wherein the first control circuit is an interface control circuit for controlling an interface communicating with an outer equipment, the second control circuit is at least one of a control circuit from among a writing control circuit for controlling a writing section which writes according to image data, a photoelectric conversion control circuit for controlling a photoelectric conversion section which receives light from an original document and converts a photoelectric conversion, a reading image processing circuit for processing image data output from the photoelectric conversion section, an operation control circuit for controlling an operation section, a sequence control circuit for controlling a sequence of an entire image forming apparatus, and an ADF control circuit for controlling an automatic document feeder, and
wherein the spreading width of the first spreading clock signals is smaller than that of the second spreading clock signals.

7. The image forming apparatus of claim 5,
wherein the first control circuit is a writing control circuit for controlling a writing section which writes according to image data, the second control circuit is at least one of a control circuit from among a photoelectric conversion control circuit for controlling a photoelectric conversion section which receives light from an original document and conducts a photoelectric conversion, a reading image processing circuit for processing image data output from the photoelectric conversion section, an operation control circuit for controlling an operation section, a sequence control circuit for controlling a sequence of an entire image forming apparatus, an ADF control circuit for controlling an automatic document feeder, and an interface control circuit for controlling an interface communicating with an outer equipment, and
wherein the spreading width of the first spreading clock signals is smaller than that of the second spreading clock signals.

8. The image forming apparatus of claim 5,
wherein the first control circuit is a photoelectric conversion control circuit for controlling a photoelectric conversion section which receives light from an original document and conducts a photoelectric conversion, the second control circuit is at least one of a control circuit from among an operation control circuit for controlling an operation section, a sequence control circuit for controlling a sequence of an entire image forming apparatus, and an ADF control circuit for controlling an automatic document feeder, and
wherein the spreading width of the first spreading clock signals is smaller than that of the second spreading clock signals.

9. An image forming apparatus for forming an image on a recording material, comprising:
(a) an interface control circuit for controlling an interface communicating with an outer equipment, which is driven by first spreading clock signals in which a band of a reference clock that is synchronized with a predetermined frequency is spread;
(b) a writing control circuit for controlling a writing section which writes according to image data, which is driven by second spreading clock signals in which a band of a reference clock that is synchronized with the predetermined frequency, is spread;
(c) a photoelectric conversion control circuit for controlling a photoelectric conversion section which receives light from an original document and conducts a photoelectric conversion, which is driven by third spreading clock signals in which a band of a reference clock that is synchronized with the predetermined frequency is spread; and
(d) at least one of a control circuit from among an operation control circuit for controlling an operation section, a sequence control circuit for controlling a sequence of an entire image forming apparatus, and an ADF control circuit for controlling an automatic document feeder, which are driven by fourth spreading clock signals in which a band of a reference clock that is synchronized with a predetermined frequency is spread,
wherein the spreading width of the first spreading clock signals is smaller than that of the second spreading clock signals, the spreading width of the second spreading clock signals is smaller than that of the third spreading clock signals, and the spreading width of the third spreading clock signals is smaller than that of the fourth spreading clock signals.

10. The image forming apparatus of claim 9 further comprising:
a second spreading clock generator for spreading a band of a reference clock signal that is synchronized with a predetermined frequency, and for generating second spreading clock signals,
wherein the second control circuit is driven by the second spreading clock signals.

11. An image forming apparatus for forming an image on a recording material, comprising:
(a) a first spreading clock generator for spreading a band of a reference clock that is synchronized with a predetermined frequency, and generating first spreading clock signals;
(b) a first control circuit for controlling the image forming apparatus or each of the image forming apparatus, and which is driven by the first spreading clock signals;
(c) a second control circuit for controlling the image forming apparatus or each section of the image forming apparatus;
(d) a communication line through which a data communication is conduced between the first control circuit and the second control circuit; and
(e) a temporary memory section provided in the communication line for temporarily storing communicated data.

12. An image forming apparatus for forming an image on a recording material, the image forming apparatus comprising:
(a) a writing section for writing according to image data;
(b) a first spreading clock generator for spreading a band of a reference clock that is synchronized with a predetermined frequency, and for generating first spreading clock signals;
(c) a second spreading clock generator for spreading a band of a reference clock that is synchronized with a predetermined frequency, and for generating second spreading clock signals;

(d) a first control circuit for controlling the image forming apparatus or each section of the image forming apparatus, which is driven by the first spreading clock signals; and (e) a second control circuit for controlling the image forming apparatus or each section of the image forming apparatus, which is driven by the second spreading clock signals, wherein the first spreading clock generator is synchronized with the second spreading clock generator by providing a reset signal to the first and second spreading clock generators.

* * * * *